INVENTOR

BY

ATTORNEY

United States Patent Office 3,420,962
Patented Jan. 7, 1969

3,420,962

AUTOMATIC TELEPHONE EXCHANGE SWITCHING EQUIPMENT

Bloomfield James Warman, Charlton, London, England, assignor to Associated Electrical Industries Limited, London, England, a British company Filed Aug. 2, 1965, Ser. No. 476,299
Claims priority, application Great Britain, July 28, 1965, 32,041/65
U.S. Cl. 179—18 5 Claims
Int. Cl. H04n 3/00

ABSTRACT OF THE DISCLOSURE

In an automatic telephone exchange system, switching equipment of a form comprising a plurality of switching ranks and adapted for the setting up of a plurality of communication paths each composed of an outgoing portion connected to one side of a link circuit and an incoming portion connected to the other side of such link circuit, both outgoing and incoming portions being established through the switching ranks of the switching equipment, is characterised by the provision of transfer circuits each of which can serve to connect two established communication paths in series.

Figure 1:
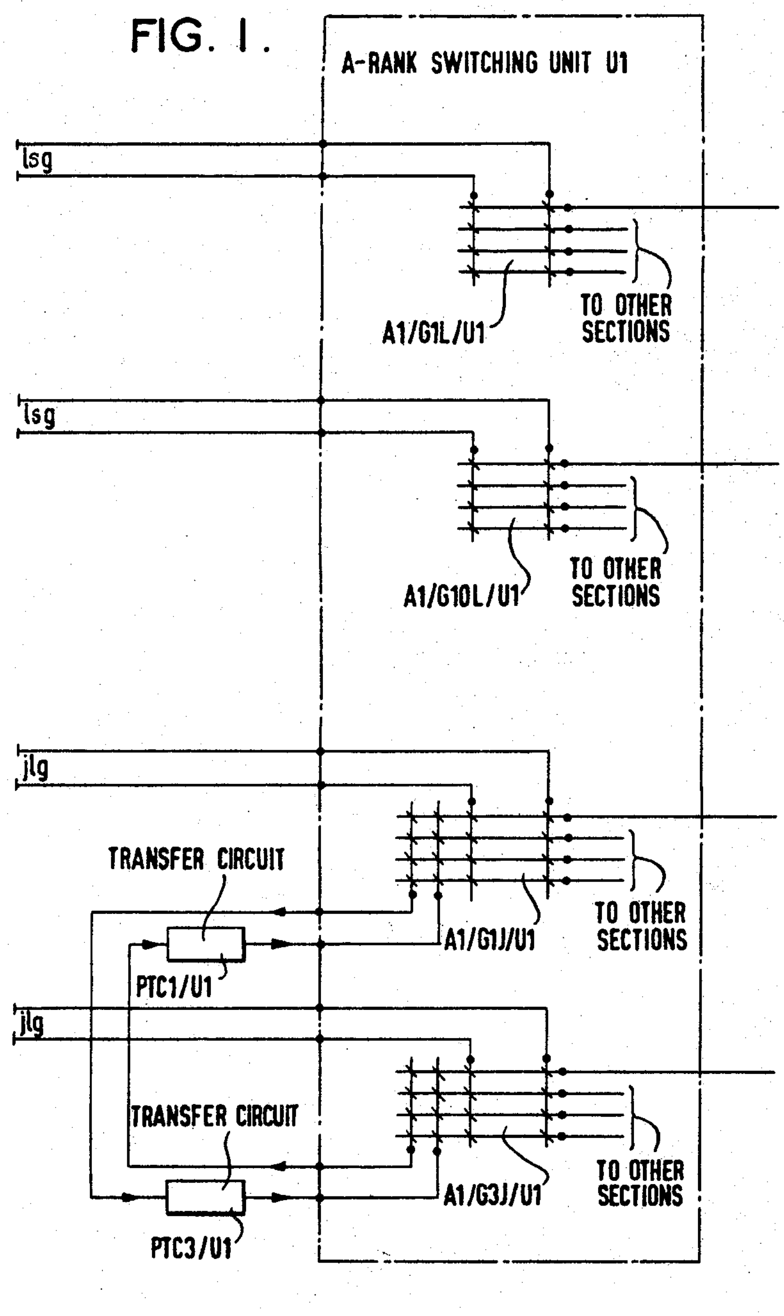
Figure 2:
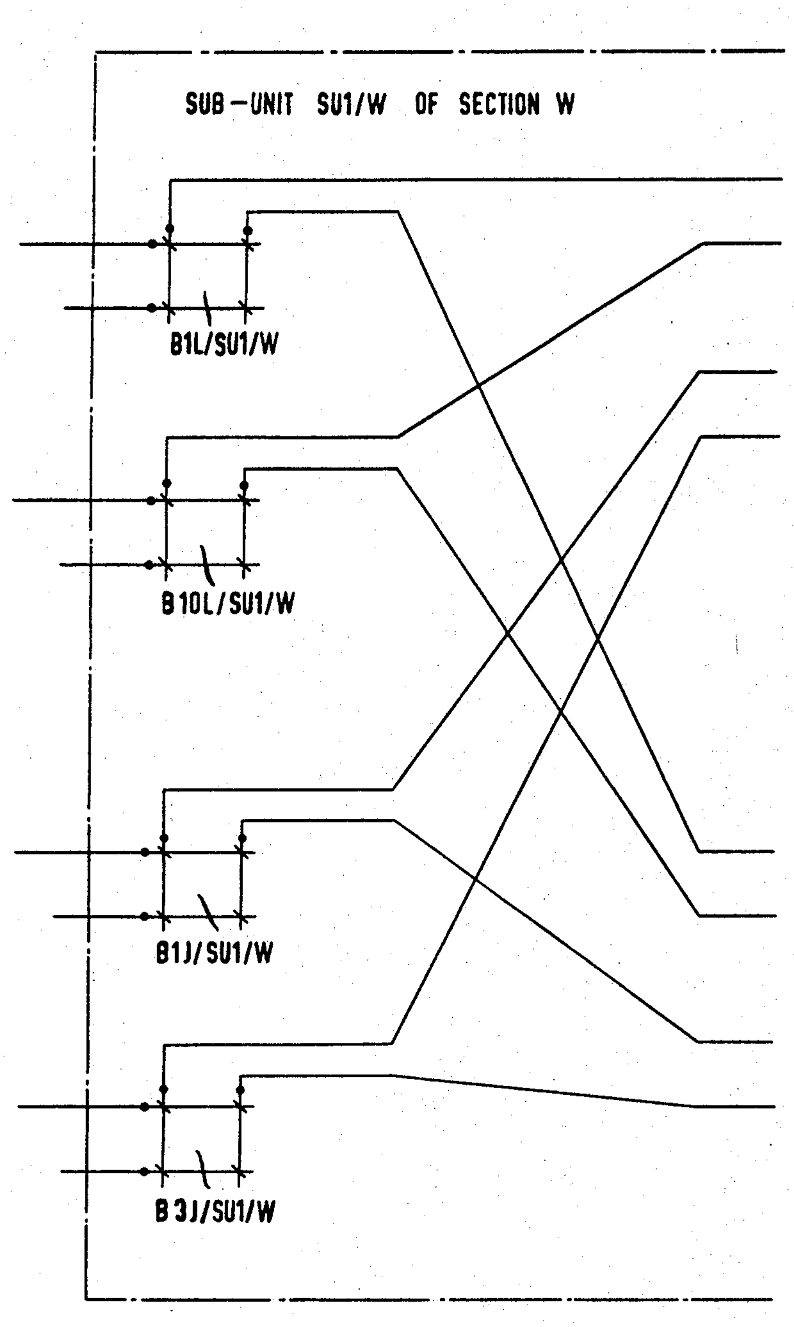
Figure 3:
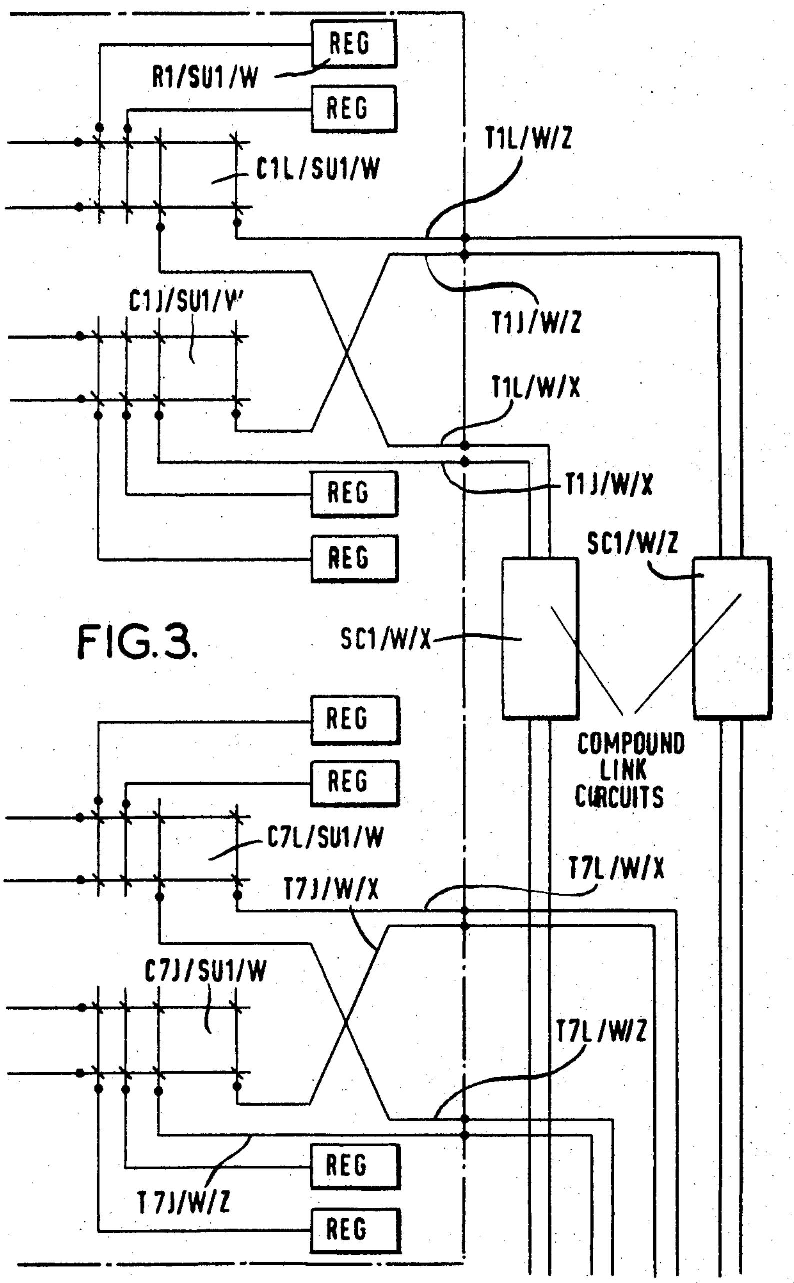
Figure 4:
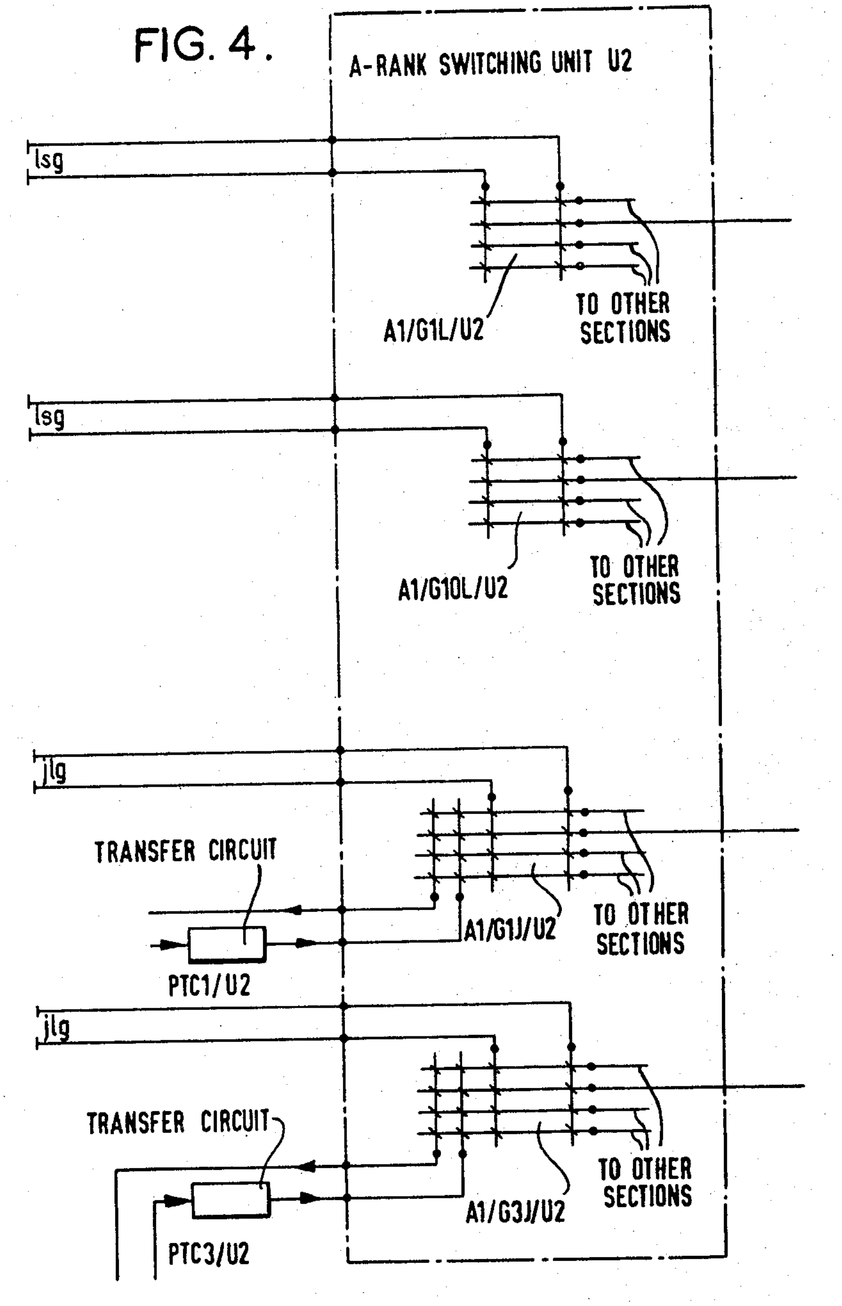
Figure 5:
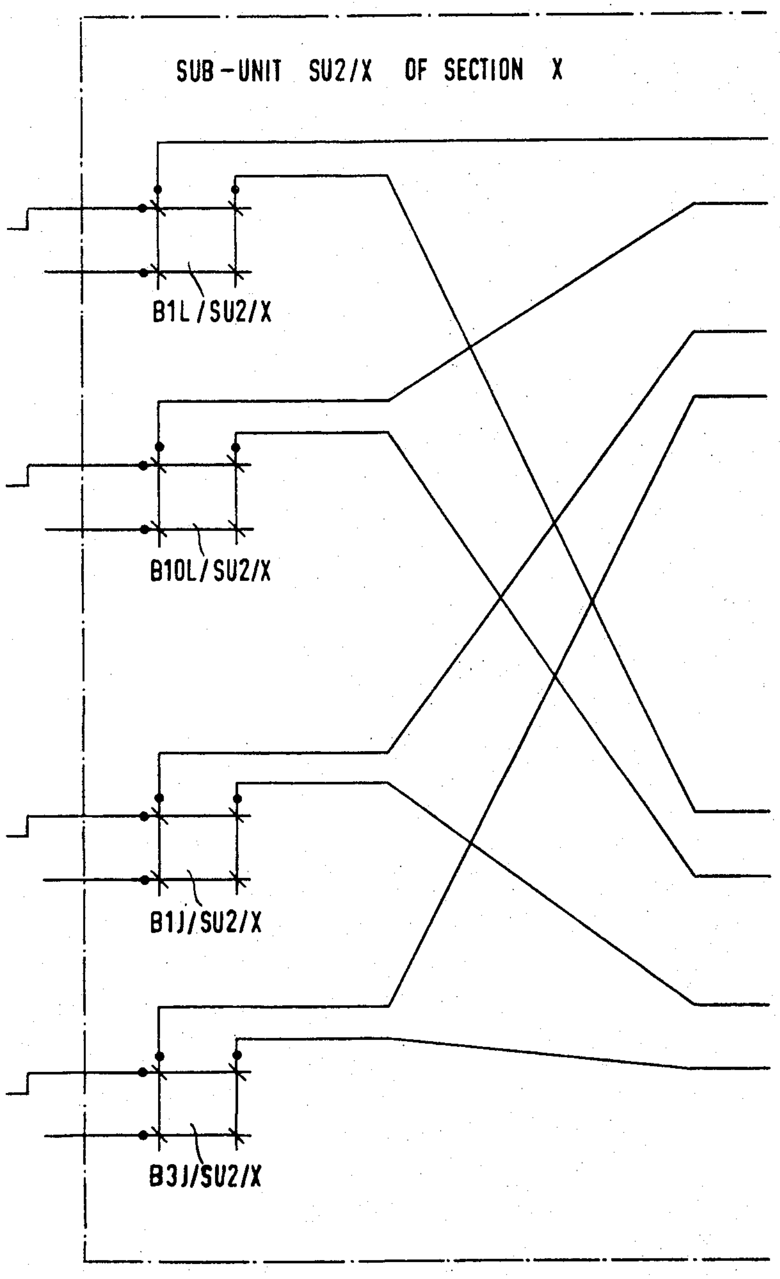
Figure 6:
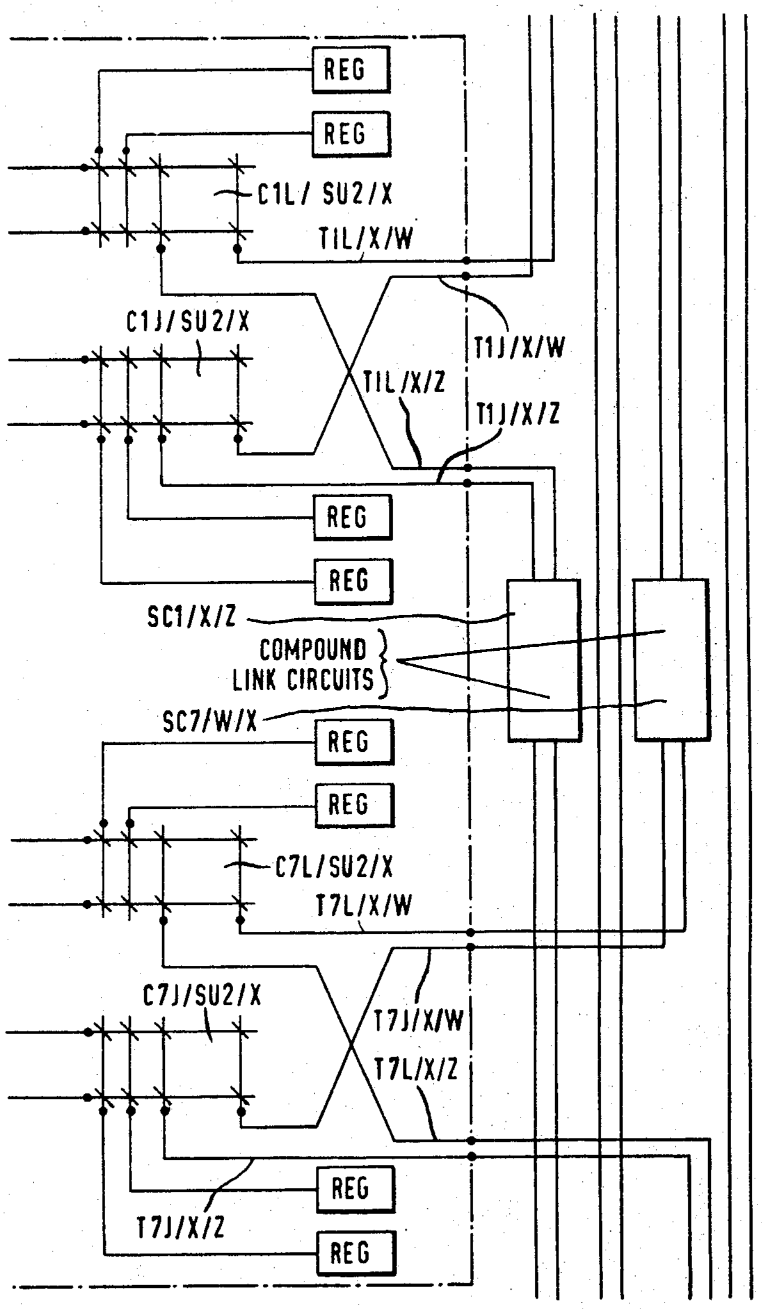
Figure 7:
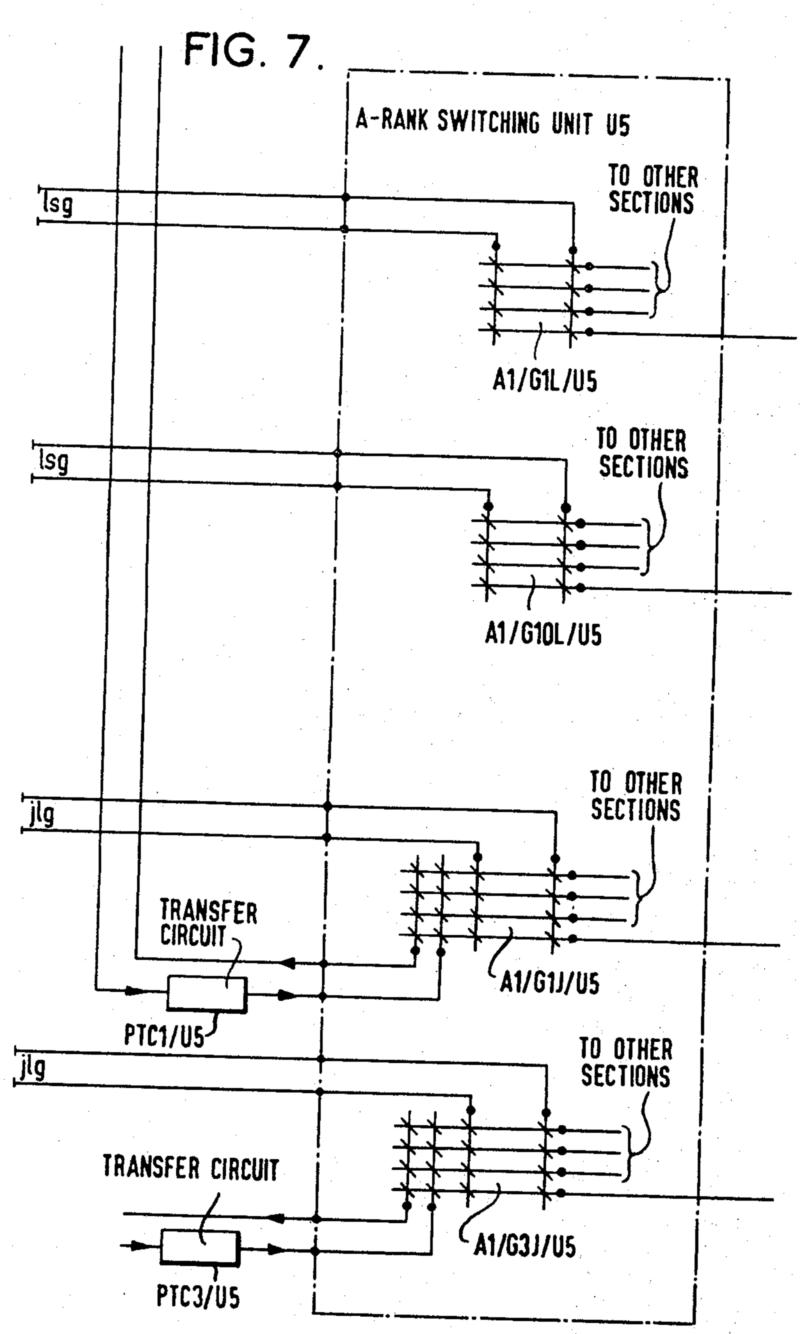
Figure 8:
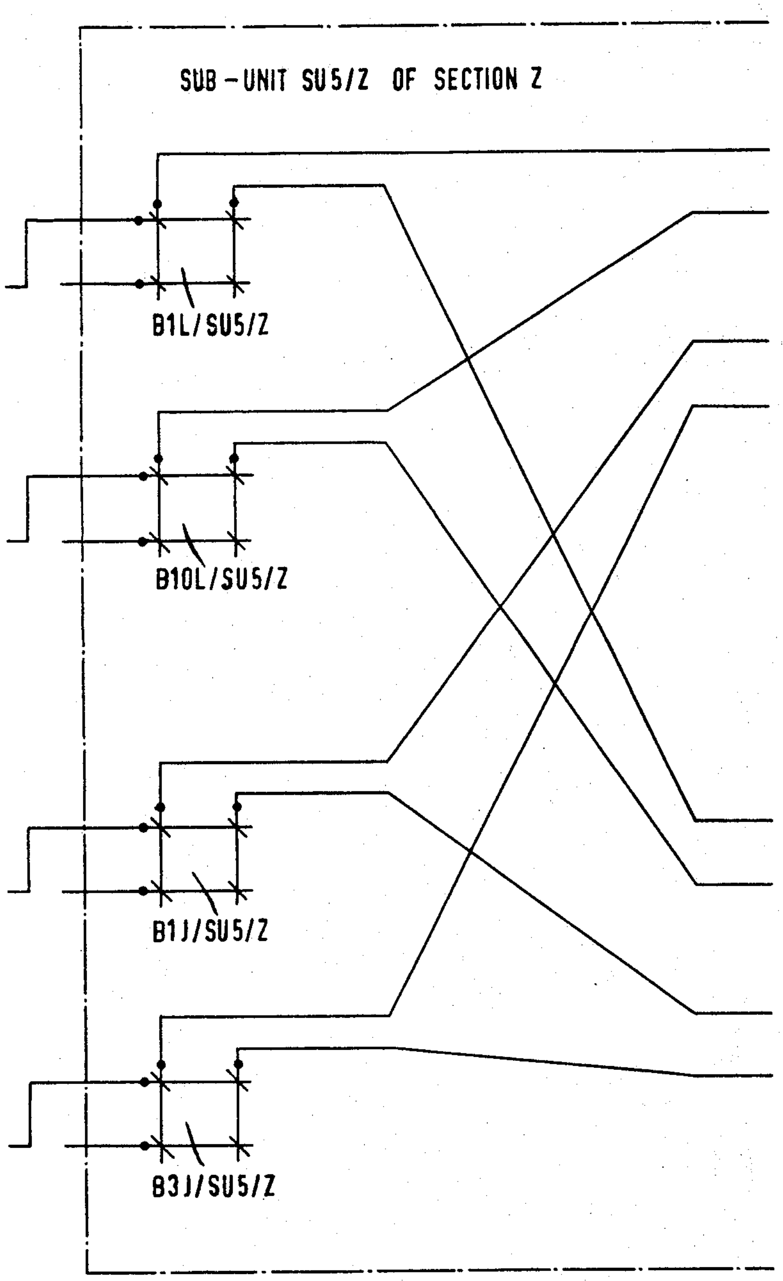
Figure 9:
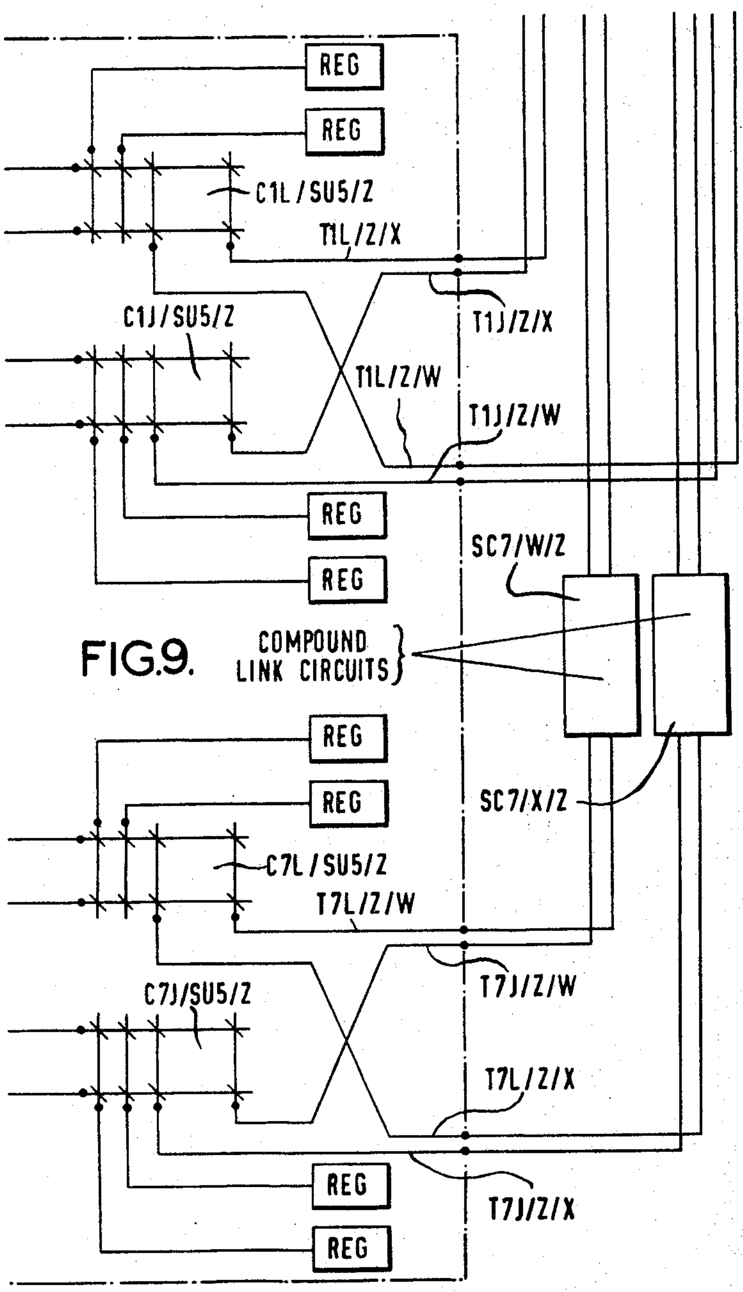

This invention relates to automatic telephone exchange systems.

In the specification accompanying my United States Patent No. 3,272,924 there is described an invention involving the concept of so-called "sectionalisation" in automatic exchange design. Basically, and in general terms, this concept is to provide the switching equipment, which in an automatic exchange permits the selective establishment of communication paths between lines connected to the exchange, in a plurality of sections which together afford between any two of said lines, through the switching equipment, a plurality of possible communication paths of which the incoming portions are respectively afforded by various ones of said sections and the outgoing portions are likewise afforded by various ones of these sections, and to provide also a section selecting arrangement which in respect of a call between two lines, and on the basis of information fed to it as to pertinent conditions relative to the several sections, is operable to cause the establishment of a connection between said two lines over such one of the possible communication paths (afforded by the sections as aforesaid) as will give best advantage having regard to said conditions. This concept of "sectionalisation" is capable of considerable extension and elaboration from and beyond its basic form.

Hereinafter, the term "section" and "sections" will be used to mean one or some or all (as the case may be) of the sections in which switching equipment at an automatic telephone exchange is provided in accordance with the concept referred to.

A form of automatic telephone exchange system which embodies the concept referred to, and which employs co-ordinate switching arrays preferably (but not necessarily) constituted by cross-point arrays using reed relays, is described in the specification accompanying my United States Patent No. 3,214,524. This particular form of automatic telephone exchange system embodying the concept referred to is one in which the switching equipment at an automatic telephone exchange is arranged so that in general, as regards any complete communication path, through the switching equipment, between any two lines connected to the exchange, the path involves two of the sections, namely a section affording an incoming portion of the path and a different section affording an outgoing portion of the path, said two portions of the path being linked by way of a link circuit ("link path"). A link circuit serving local calls includes a supervisory transmission bridge arrangement to which supervision is transferred once a call for which the link circuit is taken into use has been set up or has encountered a busy condition of the called line. On the other hand, a link circuit serving outgoing junction calls does not need to include a supervisory transmission bridge arrangement, the reason for this being that the necessary supervisory transmission bridge arrangements for outgoing junction calls are included in the outgoing junction equipments. The lines connected to the exchange have access into the several sections through a first or A rank of co-ordinate switching arrays having only one "cross-point" per line per section.

In the specification accompanying B. J. Warman and J. H. Marshall's patent application Ser. No. 462,179 filed June 8, 1965, there is described an invention which, in an important application thereof, enables an advantageous modification of the form of automatic telephone exchange system just mentioned to be achieved, a main advantage of the modification being that it results in a reduction in the amount of switching equipment required to give the traffic of the exchange access to the link circuits of the exchange. This particular modification consists in providing the link circuits in the form of compound link circuits each comprising (i) a constituent link circuit which includes a supervisory transmission bridge arrangement, and (ii) a constituent link circuit which is a "through" link circuit not including such a bridge arrangement, and (iii) switching means whereby each of these constituent link circuits can be selectively connected individually on one of its two sides to either trunk of a first pair of communication path trunks connected to the compound link circuit and can be selectively connected individually on the other of its two sides to either trunk of a second pair of communication path trunks connected to the compound link circuit, each said pair of communication path trunks comprising a terminal trunk pertaining to switching equipment serving local subscribers' lines and a terminal trunk pertaining to switching equipment serving junction lines. Each of these compound link circuits is such that in suitable circumstances it can be in use, providing requisite link circuits, on two calls at the same time.

The present invention is also one which enables an advantageous modification of the previously-mentioned form of automatic telephone exchange system to be achieved, the main advantage of this particular modification being that as a result of it the risk of the occurrence of congestion due to the fact that the first or A rank of co-ordinate switching arrays has only one "cross-point" per line per section is considerably reduced.

In the applications of this invention which are at present especially envisaged, the invention is employed in conjunction with the invention that forms the subject of the last mentioned Patent Application.

According to a main feature of the present invention, there is provided (in or for an automatic telephone exchange in which switching equipment is provided in sections in accordance with the concept referred to, and in which a basic or normal form of communication path set up through the exchange for a call involving the exchange comprises incoming and outgoing portions established through switching ranks and involving different sections and linked by way of a link circuit) a transfer circuit through the medium of which two communication paths of said basic or normal form can, when traffic considerations render such action requisite or desirable, be connected in serial relationship to provide a communication path through the exchange for a call involving the exchange.

It is envisaged that such a transfer circuit may be a reversible or bothway circuit, but at present it is preferred to employ, in carrying out the invention, a one-way form of transfer circuit.

It is further envisaged that such a transfer circuit may have individual or available to it register equipment providing, in respect of a call setup by way of the transfer circuit, for the re-routing of the call (while the call is still in progress) when it becomes possible or desirable to employ a single communication path of said basic or normal form for connecting together, telephonically, the relevant two lines connected to the exchange.

The nature of the invention will be more clearly understood from the description which will now be given with reference to the accompanying drawings. FIGS. 1 to 9 of these drawings together constitute, when assembled in the manner shown in FIG. 10, a schematic trunking diagram pertaining to an automatic telephone exchange embodying the present invention. FIG. 11 is a circuit diagram showing the constitution and organisation of a one-way form of transfer circuit used in the arrangements illustrated in the trunking diagram just referred to.

Figure 10:
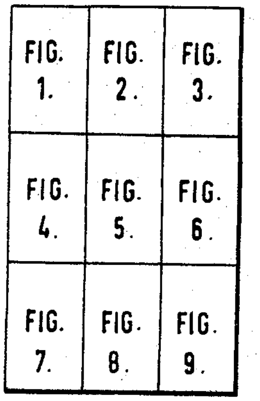
Figure 11:
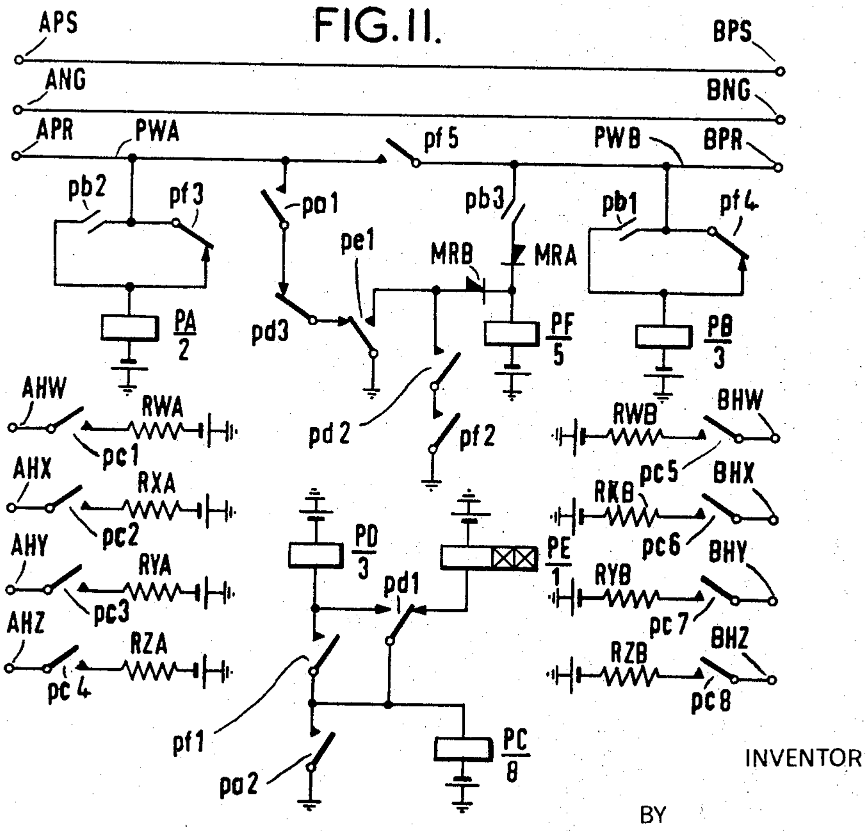

Referring firstly to FIGS. 1 to 9 (which as just indicated should be viewed assembled in the manner shown in FIG. 10), the schematic trunking diagram constituted by these figures shows certain typical co-ordinate switching arrays of three switching ranks. The typical switching arrays shown are twelve arrays A1/G1L/U1, A1/G10L/U1 . . . A1/G1J/U5, and A1/G3J/U5 of a first or A rank, twelve arrays B1L/SU1/W, B10L/SU1/W . . . B1J/SU5/Z, and B3J/SU5/Z of a second or B rank, and twelve arrays C1L/SU1/W, C1J/SU1/W . . . C7L/SU5/Z, and C7J/SU5/Z of a third or C rank.

The switching arrays of the A rank are divided into a plurality of A-rank switching units only three of which, namely units U1, U2, and U5, are represented in the diagram. Each A-rank switching unit comprises, in the exemplary case for which the diagram is drawn and designated, ten groups of switching arrays serving local subscribers' lines, and three groups of switching arrays serving junction lies. Each group of A-rank switching arrays serving local subscribers' lines contains a number of switching arrays that is the same for all such groups, and each group of A-rank switching arrays serving junction lines contains a number of switching arrays that is the same for all such groups. Of the four typical switching arrays of A-rank switching unit U1 which are represented in the diagram, the array A1/G1L/U1 is the first array of the first group of, and the array A1/G10L/U1 is the first array of the tenth group of, the switching arrays of this unit that serve local subscribers' lines, while the array A1/G1J/U1 is the first array of the first group of, and the array A1/G3J/U1 is the first array of the third group of, the switching arrays of this unit that serve junction lines. Correspondingly, of the four typical switching arrays of A-rank switching unit U2 which are represented in the diagram, the array A1/G1L/U2 is the first array of the first group of, and the array A1/G10L/U2 is the first array of the tenth group of, the switching arrays of this unit that serve local subscribers' lines, while the array A1/G1J/U2 is the first array of the first group of, and the array A1/G3J/U2 is the first array of the third group of, the switching arrays of this unit that serve junction lines, and so on in regard to the four typical switching arrays A1/G1L/U5, A1/G10L/U5, A1/G1J/U5, and A1/G3J/U5 of A-rank switching unit U5 which are represented in the diagram. Each of the switching arrays such as A1/G1L/U1, A1/G10L/U1, A1/G1L/U2, A1/G10L/U2, A1/G1L/U5, and A1/G10L/U5 serves a sub-group *lsg* of the subscribers' lines connected to the exchange, and each of the switching arrays such as A1/G1J/U1, A1/G3J/U1, A1/G1J/U2, A1/G3J/U2, A1/G1J/U5, and A1/G3J/U5 serves a sub-group *jlg* of the junction lines connected to the exchange. In addition to the vertical multi-conductor connections which are connected to communication path terminal trunks that are connected to junction lines, the switching arrays such as A1/G1J/U1, A1/G3J/U1 . . . A1/G1J/U5, and A1/G3J/U5 have vertical multi-conductor connections which are connected to communication path terminal trunks that are connected to transfer circuits provided in accordance with the present invention. Only six typical such transfer circuits, namely one-way transfer circuits PTC1/U1, PTC3/U1, PTC1/U2, PTC3/U2, PTC1/U5, and PTC3/U5, are represented in the diagram. The constitution, organisation and use of these transfer circuits will be dealt with later on in this specification.

The switching arrays of the second and third, or B and C, ranks are provided in four sections W, X, Y and Z, all of which are identical as regards the provision and interconnection of switching arrays therein. The B-rank and C-rank switching arrays are divided into as many units as there are A-rank switching units, the B-rank and C-ranks arrays included in the several units in each section forming sub-units. Only three typical such sub-units are represented in the diagram, namely sub-unit SU1/W of section W, sub-unit SU2/X of section X, and sub-unit SU5/Z of section Z. Each such sub-unit comprises, in the exemplary case for which the diagram is drawn and designated, ten B-rank switching arrays serving local subscribers' lines, three B-rank switching arrays serving junction lines, seven C-rank switching arrays serving local subscribers' lines, and seven C-rank switching array serving junction lines. Of the eight typical switching arrays of sub-unit SU1/W which are represented in the diagram, the arrays B1L/SU1W and B10L/SU1/W are the first and tenth ones respectively of the ten B-rank switching arrays of this sub-unit that serve local subscribers' lines, the arrays B1J/SU1/W and B3J/SU1/W are the first and third ones respectively of the three B-rank switching arrays of this sub-unit that serve junction lines, the arrays C1L/SU1/W and C7L/SU1/W are the first and seventh ones respectively of the seven C-rank switching arrays of this sub-unit that serve local subscribers' lines, and the arrays C1J/SU1/W and C7J/SU1/W are the first and seventh ones respectively of the seven C-rank switching arrays of this sub-unit that serve junction lines. Correspondingly, of the eight typical switching arrays of sub-unit SU2/X which are represented in the diagram, the arrays B1L/SU2/X and B10L/SU2/X are the first and tenth ones respectively of the ten B-rank switching arrays of this sub-unit that serve local subscribers' lines, the arrays B1J/SU2/X and B3J/SU2/X are the first and third ones respectively of the three B-rank switching arrays of this sub-unit that serve junction lines, the arrays C1L/SU2/X and C7L/SU2/X are the first and seventh ones respectively of the seven C-rank switching arrays of this sub-unit that serve local subscribers' lines, and the arrays C1J/SU2/X and C7J/SU2/X are the first and seventh ones respectively of the seven C-rank switching arrays of this sub-unit that serve junction lines, and so on in regard to the eight typical switching arrays B1L/SU5/Z, B10L/SU5/Z, B1J/SU5/Z, B3J/SU5/Z, C1L/SU5/Z, C7L/SU5/Z, C1J/SU5/Z, and C7J/SU5/Z of sub-unit SU5/Z which are represented in the diagram. The number of horizontal multi-conductor connections in each B-rank switching array (such as B1L/SU1/W) that serves local subscribers' lines is the same as the number of switching arrays in each group of A-rank switching arrays serving local subscribers' lines, and this enables the overall scheme of interconnection between the A-rank and B-rank arrays serving local subscribers' lines to be organised on an orderly basis. Likewise, the number of horizontal multi-conductor connections in each B-rank switching array (such as B1J/SU1/W) that serves junction lines is the same as the number of switching arrays in each group of A-rank switching arrays serving junction lines, and this enables the overall scheme of interconnection between the A-rank and B-rank arrays serving junction lines to be organised on an orderly basis. In each sub-unit, the B-rank and C-rank switching arrays included in the sub-unit and serving local subscribers' lines are interconnected in such a manner that, as regards these particular arrays, each B-rank array has access to each C-rank array and each C-rank array has access to each B-rank array. Correspondingly, in each sub-unit, the B-rank and C-rank switching arrays included in the sub-unit and serving junction lines are interconnected in such a manner that, as regards these particular arrays, each B-rank array has access to each C-rank array and each C-rank has access to each B-rank array.

Certain of the vertical multi-conductor connections of each C-rank switching array give access to individual registers such as R1/SU1/W. The remaining vertical multi-conductor connections of each C-rank switching array are connected to communication path trunks that are connected to compound link circuits provided in accordance with the invention that forms the subject of the previously-mentioned patent application No. 462,179. Only six typical such link circuits, namely compound link circuits SC1/W/X, SC1/W/Z, SC1/X/Z, SC7/W/X, SC7/W/Z, and SC7/X/Z, are represented in the diagram. Each compound link circuit comprises a constituent link circuit which is a reversible bridge link circuit, a constituent lnk circuit which is a reversible "through" link circuit, and switching means whereby each of these constituent link circuits can be selectively connected individually on one of its two sides to either trunk of a first pair of communication path trunks connected to the compound link circuit and can be selectively connected individually on the other of its two sides to either trunk of a second pair of communication path trunks connected to the compound link circuit, and whereby accordingly either trunk of said first pair and either trunk of said second pair can in respect of a call be selectively connected to be linked together by way of the particular one of the constituent link circuits that is of the kind appropriate to the call concerned. Each of the two pairs of communication path trunks connected to a compound link circuit comprises a trunk (such as T1L/W/Z or T1L/W/X or T7L/W/X or T7L/W/Z or . . . or T7L/Z/X) connected to a vertical multi-conductor connection of a C-rank switching array serving local subscribers' lines, and a trunk (such as T1J/W/Z or T1J/W/X or T7J/W/X or T7J/W/Z or . . . or T7J/Z/X) connected to a vertical multi-conductor connection of a C-rank switching array serving junction lines. One of the two pairs of communication path trunks connected to a compound link circuit comprises trunks connected to vertical multi-conductor connections of C-rank switching arrays included in one sub-unit of a section, and the other of these two pairs comprises trunks connected to vertical multi-conductor connections of C-rank switching arrays included in one sub-unit of a different section. Each compound link circuit is such that in suitable circumstances it can be in use, providing requisite link circuits, on two calls at the same time.

So far as the majority of calls involving the exchange are concerned, the communication path setup through the exchange for a call is simply a communication path of a basic or normal form comprising incoming and outgoing portions established through switching ranks and involving different sections and linked by way of a link circuit. Thus, dealing now with certain typical cases by way of example, the communication path set up through the exchange for a local call from a subscriber's line connected to switching array A1/G1L/U1 of A-rank switching unit U1 to a subscriber's line connected to switching array A1/G10/U5 of A-rank switching unit U5 may simply be a communication path of said basic or normal form comprising for example an incoming portion established by way of switching arrays A1/G1L/U1, B1L/SU1/W, and C1L/SU1/W and an outgoing portion established by way of switching arrays C1L/SU5/Z, B10L/SU5/Z, and A1/G10L/U5, the two portions being linked by way of the constituent reversible bridge link circuit of compound link circuit SC1/W/Z. In this case, the constituent reversible bridge link circuit of compound link circuit SC1/W/Z is used in its non-reversed condition, and the communication path trunks connected to compound link circuit SC1/W/Z that are involved are trunks T1L/W/Z and T1L/Z/W. The communication path set up through the exchange for a transit call from an incoming junction line connected to switching array A1/G1J/U1 of A-rank switching unit U1 to an outgoing junction line connected to switching array A1/G3J/U5 of A-rank switching unit U5 may simply be a communication path of said basic or normal form comprising for example an incoming portion established by way of switching arrays A1/G1J/U1, B1J/SU1/W, and C1J/SU1/W and an outgoing portion established by way of switching arrays C1J/SU5/Z, B3J/SU5/Z, and A1/G3J/U5, the two portions being linked by way of the constituent reversible "through" link circuit of compound link circuit SC1/W/Z. In this case, the communication path trunks connected to compound link circuit SC1/W/Z that are involved are trunks T1J/W/Z and T1J/Z/W. The reversibility of a constituent reversible "through" link circuit resides in the similarity of its two sides. The communication path set up through the exchange for a call from an incoming junction line connected to switching array A1/G1J/U5 of A-rank switching unit U5 to a subscriber's line connected to switching array A1/G10L/U1 of A-rank switching unit U1 maysimply be a communication path of said basic or normal form comprising for example an incoming portion established by way of switching arrays A1/G1J/U5, B1J/SU5/Z, and C7J/SU5/Z and an outgoing portion established by way of switching arrays C7L/SU1/W, B10L/SU1/W, and A1/G10L/U1, the two portions being linked by way of the constituent reversible bridge link circuit of compound link circuit SC7/W/Z. In this case, the constituent reversible bridge link circuit of compound link circuit SC7/W/Z is used in its reversed condition, and the communication path trunks connected to compound link circuit SC7/W/Z that are involved are trunks T7J/Z/W and T7L/W/Z. The communication path setup through the exchange for a call from a subscriber's line connected to switching array A1/G1L/U2 of A-rank switching unit U2 to an outgoing junction line connected to switching array A1/G3J/U5 of A-rank switching unit U5 may simply be a communication path of said basic or normal form comprising for example an incoming portion established by way of switching arrays A1/G1L/U2, B1L/SU2/X, and C7L/SU2/X and an outgoing portion established by way of switching arrays C7J/SU5/Z, B3J/SU5/Z, and A1/G3J/U5, the two portions being linked by way of the constituent reversible "through" link circuit of compound link circuit SC7/X/Z. In this case, the communication path trunks connected to compound link circuit SC7/X/Z that are involved are trunks T7L/X/Z and T7J/Z/X.

Dealing now with the use of the one-way transfer circuits, such as PTC1/U1, PTC3/U1, . . . PTC1/U5, and PTC3/U5, that are provided in accordance with the present invention, through the medium of such a transfer circuit two communication paths of the basic or normal form just referred to can, when traffic considerations render such action requisite or desirable, be connected in serial relationship to provide a communication path through the exchange for a call involving the exchange. Thus, taking certain typical cases by way of example, the communication path set up through the exchange for a local call from a subscriber's line connected to switching array A1/G1L/U1 of A-rank switching unit U1 to a subscriber's line connected to switching array A1/G10L/U1 of this A-rank switching unit may comprise for example two communication paths of said basic or normal form connected in serial relationship through the medium of the transfer circuit PTC1/U5, these two paths being (i) a first communication path of said basic or normal form comprising an incoming portion established by way of switching arrays A1/G1L/U1, B1L/SU1/W, and C1L/SU1/W and an outgoing portion established by way of switching arrays C1J/SU2/X, B3J/SU2/X, and A1/G3J/U2, the two portions being linked by way of the constituent reversible "through" link circuit of the compound link circuit SC1/W/X, and (ii) a second communication path of said basic or normal form comprising an incoming portion established by way of switching arrays A1/G1J/U5, B1J/SU5/Z, and C7J/SU5/Z and an outgoing portion established by way of switching arrays C7L/SU1/W, B10L/SU1/W, and A1/G10L/U1, the two portions being linked by way of the constituent reversible bridge link circuit of compound link circuit SC7/W/Z. In this case, the constituent reversible bridge link circuit of compound link circuit SC7/W/Z is used in its reversed condition, the communication path trunks connected to compound link circuit SC7/W/Z that are involved are trunks T7J/Z/W and T7L/W/Z, and the communication path trunks connected to compound link circuit SC1/W/X that are involved are trunks T1L/W/X and T1J/X/W. The communication path set up through the exchange for a local call from a subscriber's line connected to switching array A1/G1L/U2 of A-rank switching unit U2 to a subscriber's line connected to switching array A1/G1L/U5 of A-rank switching unit U5 may comprise for example two communication paths of said basic or normal form connected in serial relationship through the medium of the transfer circuit PTC3/U1, these two paths being (i) a first communication path of said basic or normal form comprising an incoming portion established by way of switching arrays A1/G1L/U2, B1L/SU2/X, and C7L/SU2/X and an outgoing portion established by way of switching arrays C7J/SU1/W, B1J/SU1/W, and A1/G1J/U1, the two portions being linked by way of the constituent reversible "through" link circuit of the compound link circuit SC7/W/X, and (ii) a second communication path of said basic or normal form comprising an incoming portion established by way of switching arrays A1/G3J/U1, B3J/SU1/W, and C1J/SU1/W and an outgoing portion established by way of switching arrays C1L/SU5/Z, B1L/SU5/Z, and A1/G1L/U5, the two portions being linked by way of the constituent reversible bridge link circuit of compound link circuit SC1/W/Z. In this case, the constituent reversible bridge link circuit of compound link circuit SC1/W/Z is used in its non-reversed condition, the communication path trunks connected to compound link circuit SC1/W/Z that are involved are trunks T1J/W/Z and T1L/Z/W, and the communication path trunks connected to compound link circuit SC7/W/X that are involved are trunks T7L/X/W and T7J/W/X. The communication path set up through the exchange for a call from a subscriber's line connected to switching array A1/G1L/U1 of A-rank switching unit U1 to an outgoing junction line connected to switching array A1/G3J/U1 of this A-rank switching unit may comprise for example two communication paths of said basic or normal form connected in serial relationship through the medium of the transfer circuit PTC3/U2, these two paths being (i) a first communication path of said basic or normal form comprising an incoming portion established by way of switching arrays A1/G1L/U1, B1L/SU1/W, and C1L/SU1/W and an outgoing portion established by way of switching arrays C1J/SU5/Z, B1J/SU5/Z, and A1/G1J/U5, the two portions being linked by way of the constituent reversible "through" link circuit of the compound link circuit SC1/W/Z and (ii) a second communication path of said basic or normal form comprising an incoming portion established by way of switching arrays A1/G3J/U2, B3J/SU2/X, and C1J/SU2/X and an outgoing portion established by way of switching arrays C1J/SU1/W, B3J/SU1/W, and A1/G3J/U1, the two portions being linked by way of the constituent reversible "through" link circuit of the compound link circuit SC1/W/X. In this case, the communication path trunks connected to compound link circuit SC1/W/Z that are involved are trunks T1L/W/Z and T1J/Z/W, and the communication path trunks connected to compound link circuit SC1/W/X that are involved are trunks T1J/X/W and T1J/W/X.

Referring now to FIG. 11, this is a circuit diagram illustrating the one-way form of transfer circuit used in the arrangement illustrated in the trunking diagram constituted by FIGS. 1 to 9. Each of the transfer circuits typified by the transfer circuits PTC1/U1, PTC3/U1 . . . PTC1/U5, and PTC3/U5 is a transfer circuit of this form. This one-way form of transfer circuit has seven terminals on its incoming side (the left-hand side as shown) and seven terminals on its outgoing side (the right-hand side as shown). The terminals on the incoming side comprise a positive-wire terminal APS, a negative-wire terminal ANG, a private-wire terminal APR, and four holding-wire terminals AHW, AHX, AHY, and AHZ corresponding respectively to the four sections W, X, Y, and Z in which the switching arrays of the B and C ranks are provided, the connections of the incoming side of the transfer circuit to the relevant A-rank switching array being such that whereas the terminals APS, ANG, and APR are connected to the respective corresponding conductors of what is a true "vertical" multiconductor connection of the array, the terminals AHW, AHX, AHY, and AHZ are connected to the respective appropriate corresponding conductors pertaining to individual cross-points of the array. Corresponding, the terminals on the outgoing side of the transfer circuit comprise a positive-wire terminal BPS, a negative-wire terminal BNG, a private-wire terminal BPR, and four holding-wire terminals BHW, BHX, BHY, and BHZ corresponding respectively to the four sections W, X, Y, and Z, the connections of the outgoing side to the relevent A-rank switching array being such that whereas the terminals BPS, BNG, and BPR are connected to the respective corresponding conductors of what is a true "vertical" multiconductor connection of the array , the terminals BHW, BHX, BHY, and BHZ are connected to the respective appropriate corresponding conductors pertaining to individual cross-points of the array. Each holding-wire terminal has individual to it one of the eight contacts *pc*1 to *pc*8 of a relay PC and one of eight resistors RWA, RXA . . . RYB, and RZB. The transfer circuit provides direct through connections between positive-wire terminal APS and positive-wire terminal BPS, and between negative-wire terminal ANG and negative-wire terminal BNG. Of the six relays PA to PF included in the transfer circuit, relay PB is a reed relay, and relay PE is a thermal relay having a long operating lag (e.g. an operating lag of the order of 4 seconds).

When the transfer circuit is free, it tests free to a marker by reason of the fact that there is then a negative battery condition on incoming private wire PWA, this negative battery condition being due to the connection of wire PWA to negative battery by way of contact *pf*3 and the winding of relay PA. When the transfer circuit is taken into use for a call, relay PA is operated as the result of the receipt at the transfer circuit, by way of terminal APR, of a seizing and busying signal in the form of an earth condition lasting about 10 milliseconds. The operating circuit for relay PA includes, of course, contact *pf*3. The closing of contact *pa*1 connects earth to wire PWA within the transfer circuit itself, the earth connection including contacts *pd*3 and *pe*1 and having the consequences that the transfer circuit continues to test busy, and relay PA is held operated, upon the termination of the seizing and busying signal. The maintenance of the earth condition on the incoming private wire serves to give an indication (to the register controlling the setting up of the call) that the transfer circuit has been effectively taken into use. The closing of contact *pa2* operates relay PC in an obvious circuit, and completes an energising circuit over contact *pd1* for the slow-operating thermal relay PE. The closing of contacts *pc1* to *pc8* causes a holding condition (battery over a resistor) to be applied to each of the holding-wire terminals AHW to AHZ and BHW to BHZ. All these operations take place upon the setting up of the first of the two communication paths of the basic or normal form previously referred to that are to be connected in serial relationship (through the medium of the transfer circuit) to provide a communication path through the exchange for the call concerned. If, as usually happens, the second of the two communication paths of said basic or normal form is successfully set up, then upon the setting up of this path the outgoing private wire PWB is earthed from a point ahead (from a reversible bridge link circuit in the case of a call to a local subscriber, and from an outgoing junction equipment in the case of a call to an outgoing junction line). This earthing of wire PWB results in the operation of reed relay PB in a circuit including contact *pf4*. The closing of contact *pb1* renders the circuit of relay PB independent of contact *pf4*, the closing of contact *pb2* renders the circuit of relay PA independent of contact *pf3*, and the closing of contact *pb3* completes a circuit, including a rectifier MRA, in which relay PF is operated by the earth on wire PWB. The closing of contact *pf1* operates relay PD in a circuit over contact *pa2*, and the closing of contact *pf5* connects the incoming private wire PWA through to the outgoing private wire PWB. The changing over of contact *pd1* opens the circuit of the thermal relay PE (which owing to its long operating lag is still in its unoperated condition), and closes a holding circuit for relay PD. The closing of contact *pd2* closes a holding circuit for relay PF, this circuit being one including contact *pf2* and a retifier MRB, and the opening of contact *pd3* leaves the continued holding of relays PA and PB dependent on the continued earthing of the outgoing private wire PWB from the previously-mentioned point ahead. At the end of the call, the transfer circuit is released by the removal, at said point ahead, of the earth condition from wire PWB. Such removal causes relay PB to release followed by relay PA, relay PB releasing the more quickly of the two relays because it is a reed relay. The opening of contact *pa2* releases relays PC and PD. The opening of contacts *pc1* to *pc8* removes the holding condition from the holding-wire terminals AHW to AHZ and BHW to BHZ. The opening of contact *pd2* releases relay PF, and upon the closing of contact *pf3* the transfer circuit is ready for seizure for use on another call.

In the event that, on a call for which the transfer circuit is taken into use, the operation of relays PA and PC, upon the setting up of the first of the two communication paths that are to be connected in serial relationship through the medium of the transfer circuit, is followed by failure to set up the second of these two communication paths, then the thermal relay PE operates upon the expiry of its long operating lag. The changing over of contact *pe1* releases relay PA and operates relay PF. The opening of contact *pa2* releases relay PC, causing the holding condition to be removed from the holding-wire terminals, and opens the circuit of the thermal relay PE. The opening of contact *pf3* causes the transfer circuit to test busy pending the release of relay PE. When relay PE releases, the falling back of contact *pe1* releases relay PF, and the transfer circuit becomes ready for further seizure for use on a call.

What I claim is:

1. In an automatic telephone exchange system, comprising:

(a) a plurality of link circuits each having an incoming side and an outgoing side, (b) switching equipment comprising a plurality of switches grouped in ranks, and (c) a plurality of connections interconnecting switches in different ranks, said switches constituting means for selectively establishing communication paths through said switching equipment, each path comprising incoming and outgoing portions each of which extends through said ranks of switches via selective of the connections of said plurality thereof to the incoming side and the outgoing side, respectively, of one of said link circuits; the improvement comprising the provision in said system, in operative association with said switching equipment, of (d) a plurality of transfer circuits, each circuit, when operable, constituting means for connecting together in serial relationship two of said communication paths as established through said switching equipment.

2. An automatic telephone exchange system according to claim 1, wherein each of said transfer circuits comprises (a) a first set of terminals including positive-wire, negative-wire, and holding-wire terminals, (b) a second set of terminals including positive-wire, negative-wire, and holding-wire terminals, (c) a first relay, (d) a holding circuit for said first relay, said first relay being operable upon the setting up of the first of the two communication paths and locked up in said holding circuit in response to a first signal received at the transfer circuit by way of a terminal of said first set and being effective when operated to bring about the application of a holding condition to the holding-wire terminals of both said sets, and (e) a second relay which is operable upon the setting up of the second of the two communication paths in response to a second signal received at the transfer circuit by way of a terminal of said second set and which on operation controls the holding circuit for said first relay, thereby causing the maintenance of the holding condition on the holding-wire terminals of both said sets to be dependent upon the continued operation of said second relay.

3. An automatic telephone exchange system according to claim 2, wherein each transfer circuit further comprises means for effecting a forced release of said first relay, following the operation and locking up of this relay, in the event that such operation is not followed within a measured-off time period by the operation of said second relay to signify that the second of the two communication paths has been set.

4. An automatic telephone exchange system according to claim 3, wherein said means for effecting a forced release of said first relay comprises a thermal relay and an energising circuit for said thermal relay that is completed as a result of the operation of said first relay and opened as a result of the operation of said second relay, said thermal relay having an operating lag that constitutes said measured-off time period and being effective on operation to open the holding circuit of said first relay.

5. In an automatic telephone exchange system, (a) a plurality of link circuits each having an incoming side and an outgoing side, (b) switching equipment comprising a plurality of switches grouped in ranks, and (c) a number of pluralities of connections inter-connecting discrete groups of switches in different ranks such that the switching equipment is divided into a number of mutually separate sections between which none of said connections extend, said switches being operable selectively to establish communication paths through said switching equipment, each path comprising incoming and outgoing portions of which one extends through said ranks of switches in one of said sections of the switching equipment to one side of one of said link circuits and the other extends through said ranks of switches in another of said sections of the switching equipment to the other side of that link circuit, the improvement comprising the provision in said system, in operative association with said switching equipment, of (d) a plurality of transfer circuits, each circuit constituting means, when operable, for connecting together in serial relationship two of said communication paths as established through said switching equipment.

References Cited

UNITED STATES PATENTS 2,885,482 5/1959 Baker.

FOREIGN PATENTS 1,153,093 5/1959 Germany.
1,041,757 6/1964 Great Britain.

KATHLEEN H. CLAFFY, *Primary Examiner.*
L. A. WRIGHT, *Assistant Examiner.*